United States Patent [19]
Tocher

[11] Patent Number: 5,940,171
[45] Date of Patent: Aug. 17, 1999

[54] COINCIDENCE AND STEREOSCOPIC TYPE BINOCULAR RANGEFINDER DEVICE WITH SEPARABLE BINOCULAR

[75] Inventor: Angus James Tocher, Calgary, Canada

[73] Assignee: VX Optronics, Calgary, Canada

[21] Appl. No.: 09/015,041

[22] Filed: Jan. 28, 1998

[51] Int. Cl.[6] .................................................. G01C 3/14
[52] U.S. Cl. ............................................. 356/12; 356/16
[58] Field of Search .................................. 356/12, 13, 14, 356/16, 17

[56] References Cited

U.S. PATENT DOCUMENTS 5,262,838  11/1993  Tocher ........................................ 356/16
5,483,336  1/1996  Tocher ...................................... 356/3.15

Primary Examiner—F. L. Evans
Attorney, Agent, or Firm—Sheridan Ross P.C.

[57] ABSTRACT

A coincidence and stereoscopic binocular rangefinder is disclosed for measuring distance to sighted targets. The rangefinder preferably has three optical windows for receiving radiation from a sighted target allowing the user to use both his ability to align separated images in one of the eyepieces of the rangefinder, and his ability to stereoscopically sense and compare apparent target depths using both eyepieces of the rangefinder. The rangefinder also includes a novel feature whereby the binocular portion may be easily and conveniently detached from the rangefinder and used separately, and then easily reattached when distance measurement is again desired.

16 Claims, 3 Drawing Sheets

*A*

*B*

COINCIDENCE AND STEREOSCOPIC TYPE BINOCULAR RANGEFINDER DEVICE WITH SEPARABLE BINOCULAR

FIELD OF INVENTION

This invention relates to a stereoscopic and coincidence type optical rangefinding device, and more specifically, to one which allows the user to apply both his monocular ability to align separated like images, and his stereoscopic sense of depth to compare relative depths, or distances of real or apparent viewed targets. This invention further relates to a binocular rangefinder having both binocular and rangefinding components, and to one in which the binocular component may be easily separated from the rangefinding section while preserving functionality as a binocular.

BACKGROUND OF INVENTION

Coincidence type optical rangefinders have been far more popular for civilian use than stereoscopic rangefinders. This is largely due to the fact that coincidence type rangefinders require the use of only one eye to align dual or separated target images. Stereoscopic rangefinders require that both eyes be used and depend on the user's ability to sense and compare target depths. Most persons are able to immediately use coincidence type rangefinders, whereas most people cannot immediately use conventional stereoscopic type rangefinders and many seem unable to develop the ability. The explanation of this inability has a great deal to do with the design of the stereoscopic rangefinder, and as shall be described later, with the user's natural disinclination to accept an artificially introduced reference image, or "range mark", as a believable real target.

Several attempts to provide binoculars with distance measurement functionality have been made. It is convenient to equip binoculars with distance measurement ability for many reasons. Binoculars are generally used for prolonged viewing and are therefore designed for comfort and minimum eyestrain. Magnifications for hand-held binoculars are typically 8 power or less, with binocular entrance window diameters giving exit pupil diameters of 3–5 millimeters. Large exit pupil diameters allow the user to more easily center his eyes on the eyepieces, and ensure that sufficient light will be available to the user's enlarged pupils when viewing in low light or night conditions. Optical rangefinders having these attributes are easier to use and, other factors being equal, are generally more accurate. Additionally, binocular users such as boaters, wildlife observers, air traffic controllers and others are often interested in both viewing magnified images of targets, and in rangefinding the targets. Many binocular and optical rangefinder users pack their equipment into the field and need to minimize the weight of equipment carried. Packing a binocular and rangefinder combination is preferred to packing both binocular and rangefinder separately having larger total size and weight. Unfortunately, current binocular/rangefinder combinations cannot be separated, are significantly heavier than non-rangefinding binoculars and are therefore not acceptable to many binocular users. Field use binoculars are typically worn on a strap around the neck and must be lightweight so as not to be uncomfortable or annoying. The real challenge in the design of the binocular rangefinder then is to produce a design that incorporates comfortable binocular vision, accurate rangefinding, and minimum size and weight.

A few examples of attempts to design suitable binocular rangefinding devices follow. U.S. Pat. No. 4,886,347 entitled "Range-Finding Binocular", to Monroe (1989) describes a stereoscopic binocular rangefinding device. This patent teaches a device which utilizes the principles of stereoscopic rangefinding whereby the user's sense of depth is applied to compare apparent stereo depths of the real sighted target, and an artificial "range-mark" image. The range mark described is a light spot produced from an artificial light source. The light spot is produced in each telescope half of the binocular, and presented to the user's eyes to simulate a target at some depth, or distance. This patent also describes the device's form having "substantially the external appearance and size of a conventional binocular". This invention is of interest as it has true binocular functionality and would therefore presumably provide the required level of eye comfort when viewing targets and rangefinding. The device is however based on traditional stereoscopic rangefinding principles, using an artificial range mark as the reference target for comparing depths of the real sighted target. Stereoscopic rangefinders are well recognized as being difficult for most people to use effectively. During World War 11, when optical rangefinders of all types were used, Donald H. Jacobs, Senior Physicist of the U.S. Naval Observatory, weighing the pros and cons of coincidence and stereoscopic rangefinders, writes: "However, although almost anyone can successfully operate a coincidence instrument, relatively few people can successfully use a stereoscopic device. Some people seem to lose this ability with time". (Fundamentals of Optical Engineering, 1943, page 255.) The fundamental reason this statement is true has much to do with the complex nature of human visual perception, and the inability of many persons to perceive and accept an unnatural "range mark" as a real target. A very similar example is the inability of many persons to "see" 3-D stereoscopic posters that were very popular in North America in 1995, and 1996. Again, a demand is made on a human to use stereoscopic vision in a way that he may find completely unnatural.

Monroe's invention also includes many additional components needed for rangefinding such as mirrors, beamsplitters, a reversible D-C motor, mechanical gearing and power supply. All of these components add weight and size, and reduce the appeal of the device for some binocular users. Monroe has also selected a conventional binocular form, which although convenient, places limits on the practical separation of the binocular entrance windows, or entrance windows. This separation or baselength imposes a fundamental limitation on the accuracy of all triangulation based optical rangefinding systems.

U.S. Pat. No. 2,910,912 entitled "Binocular Telescope With Built-In Rangefinder" to Wohler (1959) also teaches a device in the form of a binocular with distance measurement functionality. This device is perhaps more useful than Monroe's invention for the reason that it is a coincidence type rangefinder. Binocular functionality is degraded however by the inclusion of a beamsplitter plate in each of the telescopes of the binocular. These plates serve to present coincident target images to one of the user's eyes when rangefinding. When using the device for binocular viewing only, the beamsplitter plates need to be removed to avoid presenting confusing dual images in one of the eyepieces. Further, for the device to function adequately when rangefinding, it is necessary, using optical stops, to partially block the entrance window on the side of the binocular presenting dual images to the user's eye. All of these additional optical and mechanical components used to satisfy the requirements of binocular and rangefinding functionality reduce the reliability and increase the weight of the device.

OBJECTS AND ADVANTAGES

Accordingly, it is the object of the present invention to provide a binocular rangefinding device that is both coincidence and stereoscopic in nature and usable by virtually all sighted persons. Further, the object of the present invention is to provide a binocular rangefinding device that includes a separable binocular which may then be used independent of the rangefinder when distance measurement is not required.

SUMMARY OF INVENTION

The present invention is directed towards a coincidence and stereoscopic type binocular rangefinding device. The device allows the measurement of distance from the device to targets of interest using the fundamental principles of triangulation. According to these principles, range to the target of interest may be derived by directly measuring the angle subtended from the target of interest to each of the two entrance windows of the rangefinder, the entrance windows themselves being separated by a known distance. The present invention provides three entrance windows that cooperatively provide images to the user. These images allow the user to apply both his natural ability to align coincident images presented to a single eye, and his natural ability using both eyes, to stereoscopically sense and compare images having different real or apparent depths or distances from the user. The present device overcomes the serious problem previous stereoscopic rangefinder designs have of being difficult to use for the majority of persons. It achieves this by presenting only real stereoscopic images to the user's eyes instead of presenting artificial "range mark" images which many users cannot perceive stereoscopically.

The present invention also consists of two main components, the first being a rangefinding receiver, and the second being a binocular magnifier. The rangefinding receiver receives the incoming light from the intended target, and affects the light in such a way that it is useful to the user both for viewing and for measuring distance to the target. The present invention also provides an assembly to disassociate the binocular magnifier from the rangefinding receiver so that the binocular magnifier may be used separately. In so doing, the binocular magnifier has full functionality, but no longer serves as a rangefinding device until re-attached to the rangefinding receiver. This feature is useful and desirable to users who want a binocular rangefinding device, but who also want a binocular device with minimal excess size and weight.

Further objects and advantages of the present invention will become apparent from consideration of the following description and accompanying drawings.

DETAILED DESCRIPTION OF THE INVENTION

Figure 1:
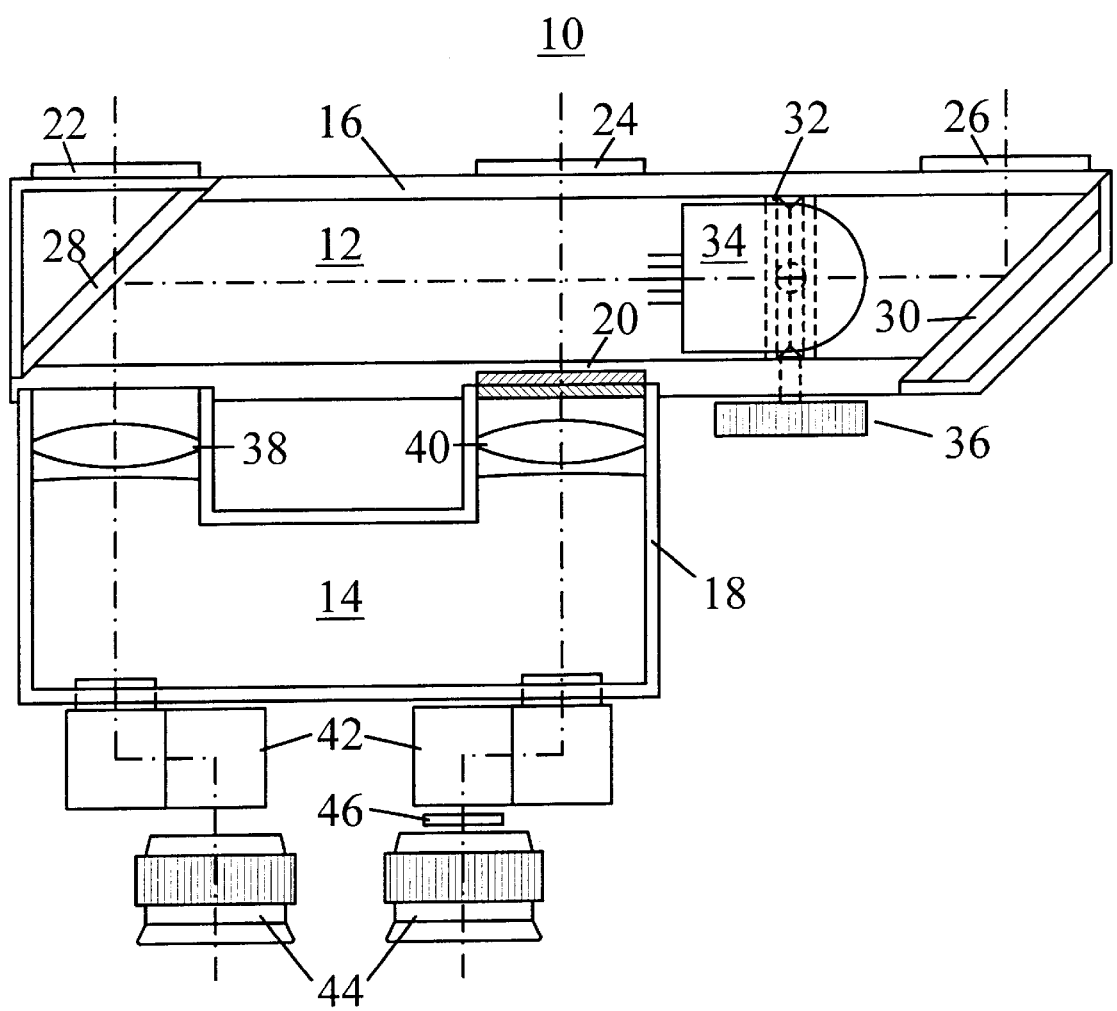
FIG. 1 is a plan view of the invention illustrating the two main components, which are the rangefinding receiver, and the binocular magnifier, attached together.

FIG. 1 illustrates one possible embodiment of invention 10, a coincidence and stereoscopic binocular rangefinding device. Invention 10 includes two primary components, rangefinding receiver 12, and binocular magnifier 14. Rangefinding receiver 12 has a receiver housing 16, and binocular magnifier 14 has a binocular housing 18. Rangefinding receiver 12 and binocular magnifier 14 attach together via a preferred mounting assembly 20. Rangefinding receiver 12 has at least a first channel rangefinder entrance window 22, and a second channel rangefinder entrance window 24, and preferably a third channel rangefinder entrance window 26. Rangefinding receiver 12 also has two optical reflectors, channel merger 28, and reflector 30. Rangefinding receiver 12 also includes parallax adjuster 32 to compensate for the parallax angle of sighted targets, and parallax measurement unit 34 for measuring the degree of compensation adjustment applied to parallax adjuster 32. Adjustment knob 36 is used to move parallax adjuster 32 when aligning the target images coincidentally and stereoscopically. Binocular magnifier 14 typically includes first channel binocular entrance window 38, second channel binocular entrance window 40, two image erecting prisms 42, and two binocular eyepieces 44. Data display 46 is more conveniently mounted in binocular magnifier 14 for easy reading of measured target distances.

Figure 2:
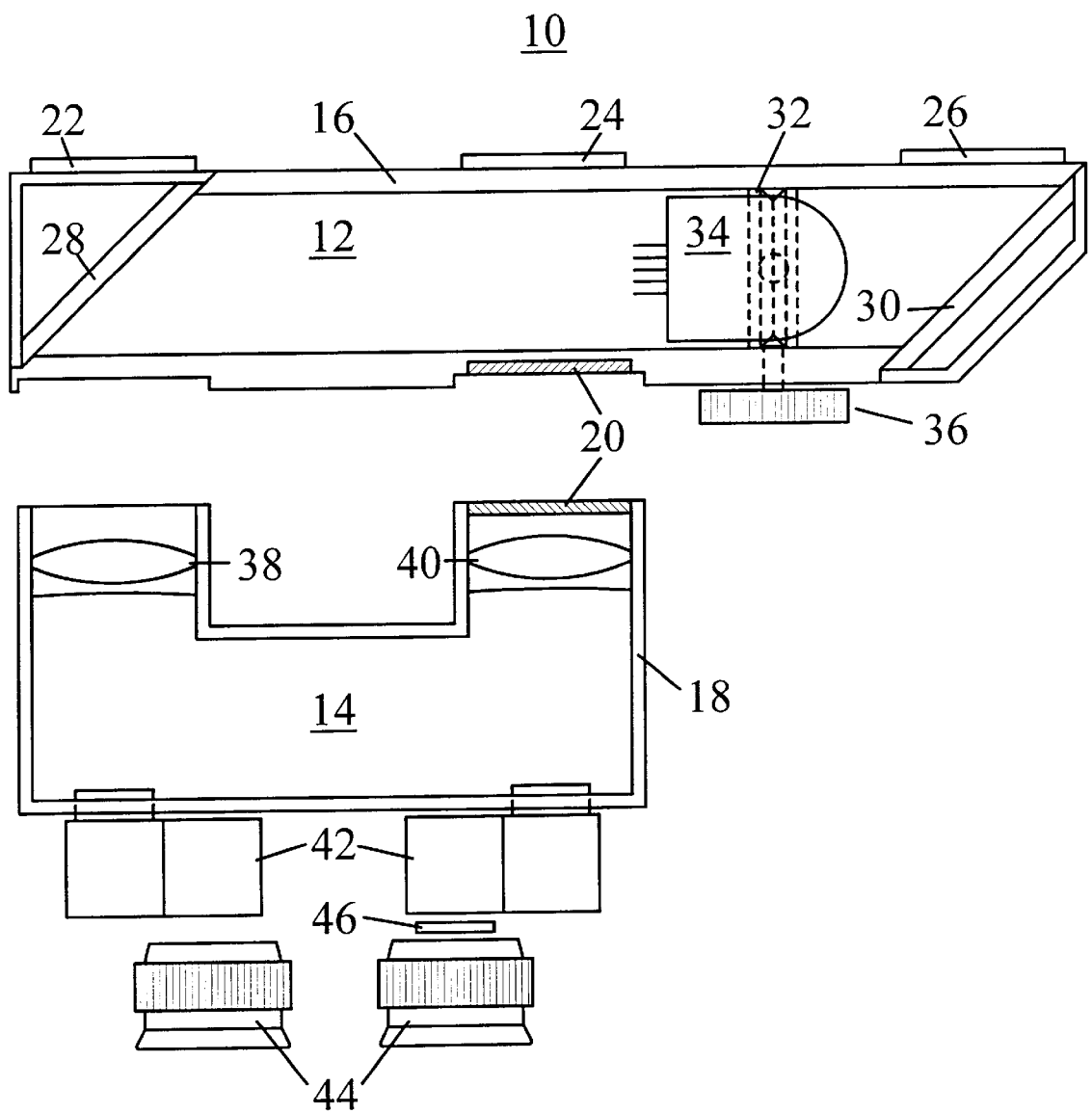
FIG. 2 is also a plan view of the invention with its two main components detached from each other.

FIG. 2 again illustrates invention 10 but with binocular magnifier 14 separated from rangefinding receiver 12. Rangefinding receiver 12 is intended to be used in conjunction with binocular magnifier 14. It could be possible to use rangefinding receiver 12 without binocular magnifier 14, but it is more convenient to use the two components together when rangefinding. Binocular magnifier 14 magnifies the images thereby increasing the user's ability to align target images into coincidence, and enhances stereoscopic depth perception. Binocular magnifier 14 also permits the user to set the correct interpupillary distance (IPD) of the eyepieces to match that of his own eyes.

Figure 3:
FIG. 3 is a schematic representation of sample coincident and stereoscopic target images presented to the binocular eyepieces when measuring target distance. The illustration is provided to show both the coincidence and stereoscopic nature of the device but not to simulate any sense of depth perception the user will have when using the invention.
Figure 3:
Figure 3:
Figure 3:

FIG. 3 illustrates an example of viewing a target through both eyepieces of binocular magnifier 14 when measuring distance with rangefinding receiver 12 attached. FIG. 3 example A shows dual target images presented in left binocular eyepiece 44, and a single target image presented in right binocular eyepiece 44. It is apparent from this illustration that the eye looking into left binocular eyepiece 44 is able to discern dual target images when the images have not yet been aligned. When looking into both left and right eyepieces 44, the user will also have a powerful stereoscopic sense that he is seeing two targets at different depths or distances. As the user begins to make an adjustment of parallax adjuster 32, the dual target images will appear to merge into a single image, and he will also have the sense that the two targets at apparently different depths or distances are converging at a common location. Perhaps unknowingly, the user is applying both his sense of visual acuity to align the dual images into a single image in one of binocular eyepieces 44, the left in this example, and his stereoscopic perception of depth to cause the target images to appear to converge into a single target at a single location. The reason it is easy and natural for the user to stereoscopically sense the difference in depths of the two apparent targets is because they are real target images, and not artificial images as are presented by conventional stereoscopic rangefinders. The eyes accept that they are looking at two targets at different distances because the dual images presented to left binocular eyepiece 44 are real and identical, and the user has no preference for one image over the other. Artificial range marks, or "Pips" used in conventional stereoscopic rangefinders generally occupy only a small portion of the field of view of the device, appear artificial and are generally immediately ignored by most persons without prior training. Even with training, as has been stated, under stress or fatigue, it may not be possible to override the natural tendency to stereoscopically focus on the real target and ignore the artificial range mark. In the present invention, this problem no longer exists as the "range mark" or reference image is a real target image and is viewed stereoscopically as easily as the actual target image. The only way that the reference image may be distinguished from the actual target image is to move parallax adjuster 32 and notice which target image appears motionless, and which target image appears to be converging on the actual target image. The eyes accept that they are looking at two real targets as they are in fact looking at two real target images. Invention 10 will be better understood from the description of operation in the following section.

OPERATION OF INVENTION

The operation of invention 10 begins with radiation from the target of interest entering first, second and third channel rangefinder entrance windows 22, 24 and 26. The principal function of rangefinding receiver 12 is to receive the target radiation entering rangefinder entrance windows 22, 24 and 26, and direct the target radiation into binocular magnifier 14. Target radiation entering first channel rangefinder entrance window 22 passes through channel merger 28, and enters binocular magnifier 14 via first channel binocular entrance window 38, which is typically a lens. First channel binocular entrance window 38 causes an image of the sighted target to form before, in this case, left binocular eyepiece 44, which in turn magnifies the target image as viewed by the user. The primary function of image erecting prisms 42, similar to conventionally designed binoculars, is to correctly orient the viewed images to the observer. It is preferable to select binocular magnifier 14 such that binocular housing 18 is a solid housing not having the common center hinge of more conventional binocular designs. As such, a secondary function of image erecting prisms 42 is to allow the correct setting of interpupillary distance to match the interpupillary separation of the user's eyes, without changing the separation distance, or baselength, between first and second channel binocular entrance windows 38 and 40. One method of simultaneously obtaining these two results, as will be recognized by those skilled in the art, is to select porro II type prisms as image erecting prisms 42. Porro II type prisms permit the rotation of binocular eyepieces 44 around the optical axis of binocular entrance windows 38 and 40 thereby permitting the correct adjustment of interpupillary distance without changing the baselength distance of invention 10.

Target radiation entering third channel rangefinder entrance window 26 will be directed by reflector 30 into parallax adjuster 32. Third channel rangefinder entrance window 26 could be co-located with second channel rangefinder entrance window 24, with reflecting means 30 having both a reflecting and transmitting surface such as has a plate type beamsplitter. It is preferable however to provide third channel rangefinder entrance window 26 separately to both increase range measurement accuracy by increasing the triangulation baselength of the device, and to ensure that dual target images presented to left binocular eyepiece 44, in this case, are of nearly equivalent intensity. This will also be readily understood by those skilled in the art.

Parallax adjuster 32 has the critical function of deviating the direction of the target radiation entering third channel rangefinder entrance window 26 such that dual target images are aligned and presented in coincidence to one of the eyes of the user. As will be apparent, closer viewed targets will require that parallax adjuster 32 introduce a larger deviation of the target radiation in order to cause the target images to coincide, than targets at greater distances and having smaller angles of parallax. Precisely stated, the degree of angular target light deviation imposed by parallax adjuster 32 varies in inverse proportion to the target distance. This quantity of light deviation required to align the target images coincidentally and stereoscopically is a function of many additional factors including the initial optical alignment of the device, the mechanical and optical means of light deviation, and the baselength, or distance between first and third channel rangefinder entrance windows, 22 and 26. Binocular magnifier 14 serves to magnify the coincident images and thereby increase both the user's ability to align target images coincidentally, and stereoscopically. Apart from this function, binocular magnifier 14 does not affect the setting of parallax adjuster 32, and the alignment of binocular magnifier 14 to rangefinding receiver 12 does not require extreme precision. This detail is significant to the discussion of the feature of being able to separate binocular magnifier 14 from rangefinding receiver 12.

Parallax adjuster 32 preferably includes adjustment knob 36 provided to allow the user to move the optical elements of parallax adjuster 32 to cause coincident and stereoscopic alignment of the target images. Parallax measurement unit 34 has the function of measuring the degree of displacement of parallax adjuster 32 required to coincidentally and stereoscopically align the target images. Many methods are possible to effect function of parallax adjuster 32 as will be understood by those skilled in the art. One means could be to provide a mirror reflector rotatable around an axis normal to the view of FIG. 1. This method has the advantage of simplicity, but is severely disadvantaged by its inherent sensitivity to movement. For each degree of rotation, mirror reflectors introduce two degrees of angular deviation of an incident beam of radiation. As the range of parallax angles between targets ranging from 30 meters to infinity is typically less than 0.5 degrees, extreme mechanical precision is required for rangefinders using mirror reflectors as the parallax adjuster 32. A more preferred version of parallax adjuster 32 uses two low power optical wedges counter-rotating around the optical axis of the incident target beam of radiation. This is known as a diasporameter whose function and operation is well understood by those skilled in the art. The diasporameter requires a somewhat more complex mechanism to operate and measure the movement of the counter-rotating wedges. This disadvantage however is more than overcome by various advantages including insensitivity to minor mechanical errors, alignment of the optical wedges, and a large degree of angular counter-rotation of the wedges required to cause a small deviation of the target radiation light path.

Parallax measurement unit 34 likewise may use various methods for measuring the displacement of parallax adjuster 32, and converting this displacement into useful target distance data. Conventional methods include converting this displacement mechanically to a moveable scale upon which distance measurement may be read directly. U.S. Pat. No. 3,558,228 to Hodges (1971) describes this type of mechanism in detail. A more preferred method is to use an electronic position sensing device such as an optical encoder, or other such device that measures angular shaft rotation. As such, the rotation of counter-rotating wedges used in parallax adjuster 32 may be converted mechanically to the rotation of the shaft of an optical encoder used as parallax measurement unit 34. The degree of angular rotation of the optical encoder may then be sent electrically, usually in a digital format, to a small microprocessor chip. Within the microprocessor, the angular rotation value may be converted by mathematical formula, instead of mechanically, to a target distance value. This value may then be conveniently displayed to one of the viewer's eyes via data display 46. Data display 46 is more conveniently an LED or LCD set at one focal length from one of binocular eyepieces 44.

Target radiation proceeding from parallax adjuster 32 is then directed across to channel merger 28. Channel merger 28 having both a partially optically transmissive and reflective surface causes the target radiation entering both first and third channel rangefinder entrance windows 22 and 26 to merge. This merged target radiation is then directed into first channel binocular entrance window 38 and presented to one of the viewer's eyes via binocular eyepiece 44. Prior to alignment of the merged target radiation, the target images viewed in left binocular eyepiece 44 will appear as double images. In order to measure distance to the desired target, the viewer will move adjustment knob 36 causing a displacement of parallax adjuster 32 which in turn will cause an angular deviation of the target radiation entering third channel rangefinder entrance window 26. The viewer will continue to move adjustment knob 36 until the target images presented to one of the viewer's eyes converge into a single image. This describes the coincidence functionality of invention 10. The complimentary coincidence and stereoscopic functionality of invention 10 will next be described.

Light radiation from the target of interest also enters second channel rangefinder entrance window 24 and is directed to second channel binocular entrance window 40, through image erecting prism 42 and into, in this example, right binocular eyepiece 44. It is important to note that all binoculars having telescopic channels separated by a distance at least equivalent to the user's interpupillary distance, and having magnifications greater than 1, will enhance the viewer's perception of depth or distance. Invention 10 uses this binocular enhancement of depth perception to increase the user's ability to accurately range targets of interest. When dual target images are presented out of coincidence in left binocular eyepiece 44, and when viewing the target of interest through both binocular eyepieces 44, the viewer perceives two identical targets which appear stereoscopically to be at different distances. This perception is not at all unnatural as it is experienced by all humans having two healthy eyes when looking at an object, where other objects appear in the foreground or background. A simple experiment is to hold a pencil about a foot out from one's face, and alternately look at the pencil, and then at an object in the background. What one notices is that when looking at the pencil, objects in the background appear double. Likewise, when looking at a target in the background, the pencil will now appear as a double image. This effect is so common that generally it is unnoticed in daily activity. This effect is however a key principle of operation of invention 10, and will be noticed when the coincident and stereoscopic images are misaligned. The difference in perception is that by moving adjustment knob 36, the viewer will create the impression that one of the target images viewed stereoscopically is moving in space towards the second stereoscopically viewed target image. The viewer will continue to apply both his stereoscopic sense of depth and his ability to align dual images in coincidence until the target of interest appears as a single target image at a single depth or distance. Although the perception of dual images at different distances appears natural to the viewer, it is of course only an optical illusion created by merging the target radiation received through both first and third channel rangefinder entrance windows 22 and 26, presenting their respective images to one of the viewer's eyes, and presenting a third target image formed from target radiation received through second channel rangefinder entrance window 24 into the other of the viewer's eyes. This is illustrated in FIG. 3A, simulating the view through left and right binocular eyepieces 44 when the target images are misaligned both coincidentally and stereoscopically. FIG. 3B simulates the same view following coincident and stereoscopic alignment of the same target images. Neither FIGS. 3A nor 3B are able to properly convey the perception of depth which can only be had by viewing targets through the actual device.

It is apparent that the separation between first and second channel rangefinder entrance windows 22 and 24, is less than the separation between first and third channel rangefinder entrance windows 22 and 26. It is also correct to surmise that the contribution to range measurement accuracy is greater for the coincident images presented to the user's eyes than for the stereoscopic images. This stated, stereoscopic contribution is of real importance, and the added comfort and natural binocular vision afforded combine to provide a binocular rangefinding device having greater accuracy, speed and comfort of use than optical rangefinders having only a coincidence or stereoscopic nature.

A further feature of invention 10 is the ability to detach binocular magnifier 14 from rangefinding receiver 12. As stated, this is a useful function to users who want both binocular vision and distance measurement, but also wish to minimize the weight of the binocular for prolonged viewing, when the rangefinding function is not required. Having the ability to separate binocular magnifier 14 from rangefinding receiver 12 is made possible by the fact that no lenses, convergent or divergent, are present in rangefinding receiver 12. All image forming and collimating optics used to form the target images are confined to binocular magnifier 14. As such, binocular magnifier 14, when detached from rangefinding receiver 12, maintains full functionality without requiring further adjustment or focusing. An additional benefit to this confinement of lenses to binocular magnifier 14 is that magnification of the dual target images presented in left binocular eyepiece 44 is guaranteed to be equivalent. This results from the fact that target radiation enters one of binocular entrance windows 38 and 40 of binocular magnifier 14 after merging in channel merging 28. Coincidence type optical rangefinders having lenses in each optical channel prior to merging the optical channels must have lenses with very closely matched powers of magnification otherwise the resultant target images presented to the viewer's eye will have different sizes and will be impossible to align precisely.

Binocular magnifier 14 and rangefinding receiver 12 may have various embodiments of mounting assembly 20. The functional criteria for mounting assembly 20 is that it must be mechanically and operationally simple so that mounting may be accomplished quickly and preferably accomplished holding rangefinding receiver 12 in one hand, and binocular magnifier 14 in the other hand. It is also important that mounting assembly 20 is secure, and adequately aligns both main components of invention 10. A preferred mounting assembly 20 is a bayonet style, or equivalent camera style lens mount having one component of mounting assembly 20 attached to rangefinding receiver 12, centered on the optical axis of second channel rangefinder entrance window 24. The other component of mounting assembly 20 may then be attached, or form a part of, binocular magnifier 14, centered on the optical axis of, in this case, second channel binocular entrance window 40. Rangefinding receiver 12 may then engage with binocular magnifier 14 in a manner similar to mounting a lens onto a camera body. Holding binocular magnifier 14 in one hand, and rangefinding receiver 12 in the other, the two parts may be brought together aligning the complimentary components of mounting assembly 20. Using a bayonet style camera lens mount as mounting assembly 20, a single 90 degree clockwise twist of rangefinding receiver 12 will secure and lock together the two major components of invention 10. Disengaging these two major components would then simply involve the reverse of the procedure described. It is preferable that the recessed female component of mounting assembly 20 be located on binocular magnifier 14 to avoid interference of this mounting component when using binocular magnifier 14 separately. The above described preferred form of mounting assembly 20 fulfills the described criteria of mechanical simplicity, simplicity of use, speed of engagement and disengagement, reliability and familiarity. Other forms of mounting assembly 20 will be apparent to those skilled in the art.

The preceding description serves to describe the main objects and advantages of invention 10. The scope of the invention however should not be determined by the embodiments illustrated, but by the appended claims and their legal equivalents:

What is claimed is:

1. A coincidence and stereoscopic binocular rangefinding device comprising: rangefinding receiver means for receiving target radiation from a sighted target of interest, said rangefinding receiver means further comprising as follows: first, second and third channel rangefinder entrance windows through which pass said target radiation; channel merging means for merging said target radiation from at least two of said first, second and third channel rangefinder entrance windows; means for causing a directional deviation of said target radiation received through at least one of said first, second and third channel rangefinder entrance windows; means for controlling degree of said deviation imposed by said means for causing on said target radiation; and means for sensing said degree of deviation imposed by said means for causing on said target radiation; said coincidence and stereoscopic binocular rangefinding device additionally comprising:

binocular magnifier means having a first channel binocular entrance window for receiving said target radiation from said channel merging means, and having a second channel binocular entrance window for receiving target radiation from another of said first, second and third channel rangefinder entrance windows of said rangefinding receiver means, said binocular magnifier means also for presenting images formed from said target radiation to a viewer's eyes; and means for displaying data derived from said degree of deviation sensed by said means for sensing.

2. The device as recited in claim 1, further comprising a mounting means for detaching and re-attaching said binocular magnifier means from said rangefinding receiver means such that said binocular magnifier means may be used separately from said rangefinding receiver means.

3. The device as recited in claim 2, wherein said mounting means includes a camera lens type mount having male and female mounting components, one of said mounting components being attached in-line with an optical axis of one of said first, second or third channel rangefinder entrance windows of said rangefinder receiver means, and the other of said mounting components being attached in-line with an optical axis of one of said first and second channel binocular entrance windows of said binocular magnifier means.

4. The device as recited in claim 1, wherein said means for causing includes a parallax adjuster that also outputs target radiation to said channel merging means.

5. The device as recited in claim 1, wherein said means for controlling includes an adjustment knob engageable by the viewer for moving optical elements of said means for causing.

6. The device as recited in claim 1, wherein said means for sensing includes a parallax measurement unit mechanically coupled to said means for causing.

7. The device as recited in claim 1, wherein said means for displaying includes processing means.

8. The device as recited in claim 1, wherein said binocular magnifier means has all image forming and collimating optics used to form target images and said rangefinding receiver means operates independently of image forming and collimating optics that are used to form target images.

9. A binocular rangefinding device, comprising:

rangefinding receiver means for receiving target radiation from a cited target of interest, said rangefinding receiver means including a plurality of rangefinder entrance windows through which target radiation passes;

binocular magnifier means including first and second channel binocular entrance windows, wherein said first channel binocular entrance window receives target radiation from at least one of said plurality of channel rangefinder entrance windows and said second channel binocular entrance window receives target radiation from at least another one of said plurality of rangefinder entrance windows, said binocular magnifier means also for presenting images formed from target radiation to a viewer's eyes; and mounting means for detaching and re-attaching said binocular magnifier means from said rangefinding receiver means such that said binocular magnifier means can be used separately from said rangefinder receiver means.

10. The device as recited in claim 9, wherein said plurality of channel rangefinder entrance windows includes first, second and third channel rangefinder entrance windows and said rangefinding receiver means includes channel merging means for merging target radiation from at least two of said first, second and third channel rangefinder entrance windows, said first channel binocular entrance window receiving target radiation from said channel merging means and said second channel binocular entrance window receiving target radiation from another of said first, second and third channel rangefinder entrance windows.

11. The device as recited in claim 10, wherein said rangefinding receiver means further includes:

means for causing a directional deviation of target radiation received through at least one of said first, second and third channel rangefinder entrance windows;

means for controlling degree of said deviation imposed by said means for causing on target radiation;

means for sensing said degree of deviation imposed by said means for causing on target radiation; and means for displaying data derived from said degree of deviation sensed by said means for sensing.

12. The device as recited in claim 9, wherein said mounting means includes a camera lens-type mount having mating components, with one of said mating components being attached in-line with an optical axis of one of said plurality of channel rangefinder entrance windows and another of said mating components being attached in-line with an optical axis of one of said first and second channel binocular entrance windows.

13. A method for operating a device to separately perform rangefinding and binocular functions, comprising:

providing rangefinding receiver means that includes a plurality of channel rangefinder entrance windows through which target radiation passes;

providing detachable binocular magnifier means that includes first and second channel binocular entrance windows;

attaching said binocular magnifier means to said rangefinding receiver means for operating the device in order to perform the rangefinding function;

receiving target radiation through said plurality of rangefinder entrance windows;

inputting target radiation through each of said first and second channel binocular entrance windows;

determining a distance based on said target radiation received by said first and second channel binocular entrance windows;

detaching said binocular magnifier means from said rangefinding receiver means;

using said binocular magnifier means to perform a binocular function.

14. The method as recited in claim 13, wherein said inputting step includes receiving target radiation by said first channel binocular entrance window based on target radiation received by at least one of said plurality of channel rangefinder entrance windows and receiving target radiation by said second channel binocular entrance window based on target radiation received by at least another one of said channel rangefinder entrance windows.

15. The method as recited in claim 13, wherein said determining step includes causing a directional deviation of target radiation received through at least one of said plurality of channel rangefinder entrance windows, controlling degree of said deviation, sensing said degree of deviation and displaying data derived from said degree of deviation related to said distance.

16. The method as recited in claim 13, wherein said attaching step includes using first and second mating components that are in-line with an optical axis of one of said plurality of channel rangefinder entrance windows and also in-line with an optical axis of one of said first and second channel binocular entrance windows.

* * * * *